Jan. 3, 1956  J. J. BERTRAND  2,729,709
ELECTRIC SWITCH
Filed March 21, 1952  2 Sheets-Sheet 1
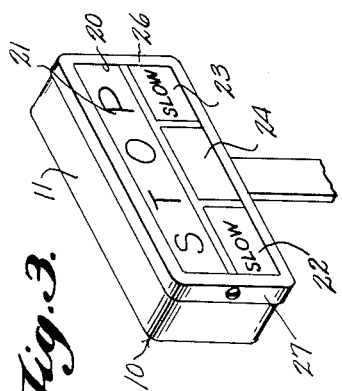
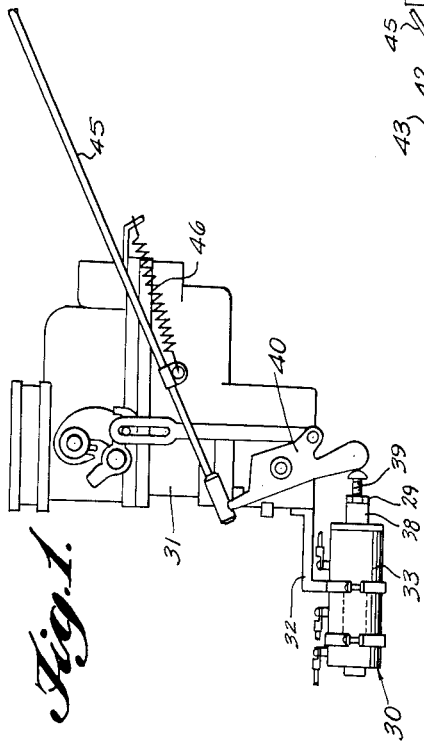
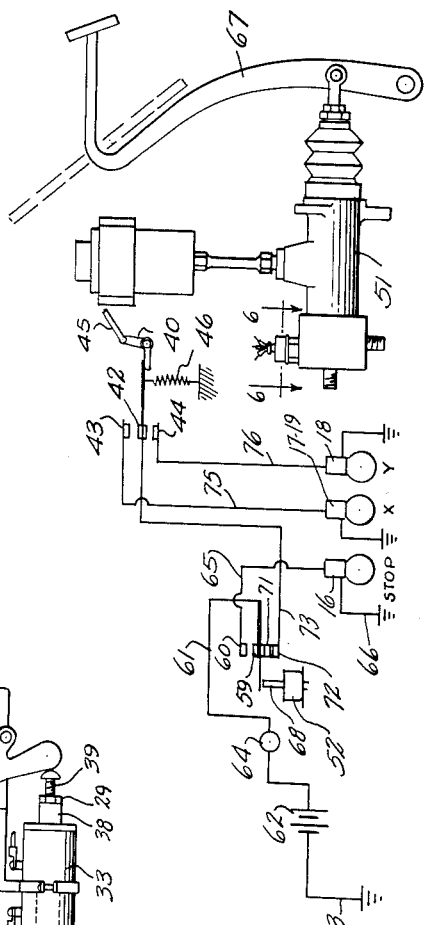
INVENTOR
JULES J. BERTRAND,
BY
McMorrow, Berman + Davidson
ATTORNEYS.

Jan. 3, 1956  J. J. BERTRAND  2,729,709
ELECTRIC SWITCH
Filed March 21, 1952   2 Sheets-Sheet 2
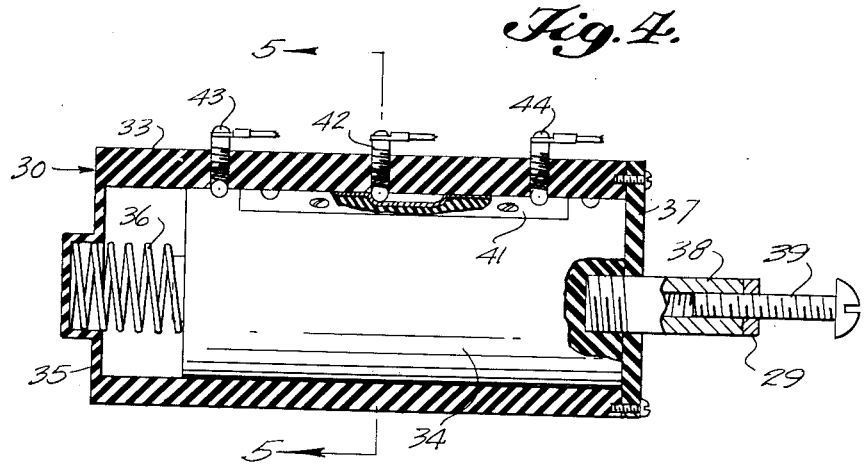
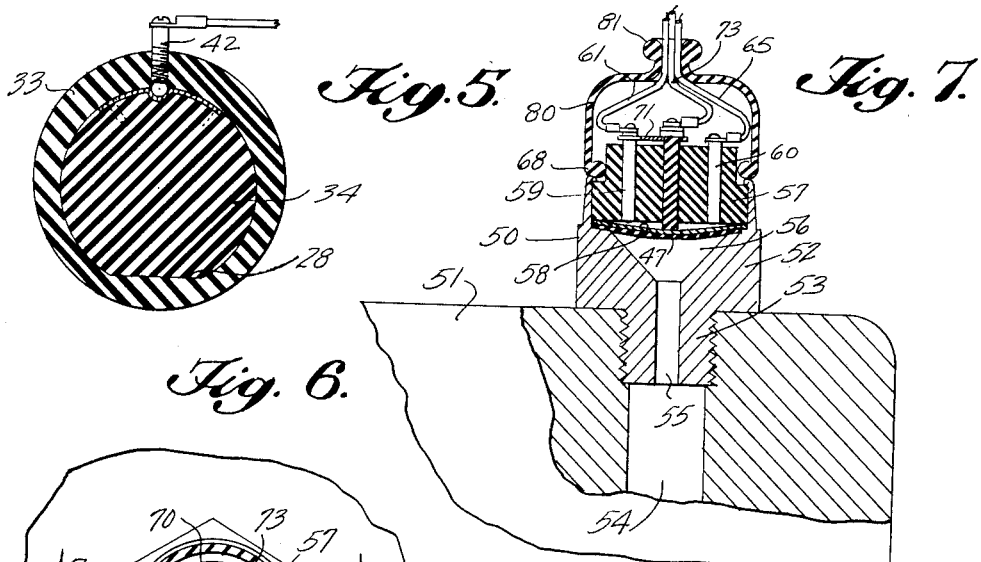
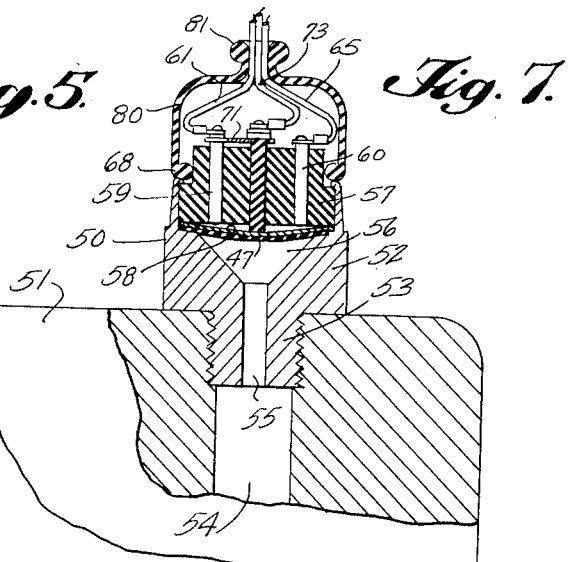
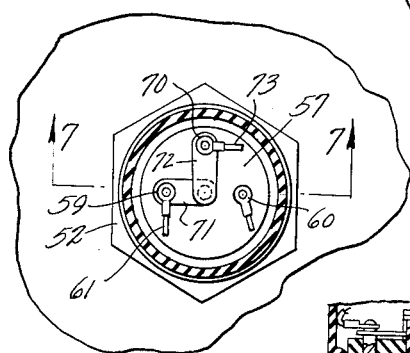
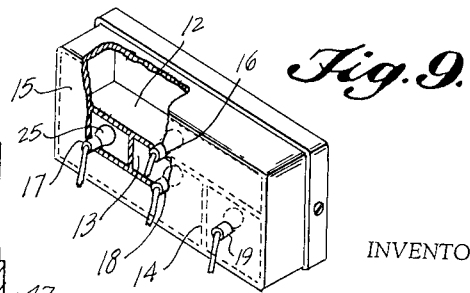
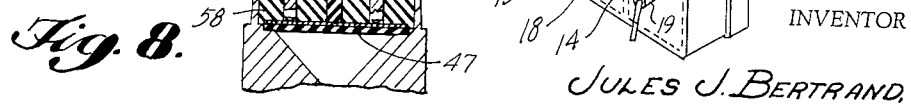
INVENTOR
JULES J. BERTRAND,
BY
McMorrow, Berman + Davidson
ATTORNEYS

United States Patent Office 2,729,709
Patented Jan. 3, 1956

2,729,709

ELECTRIC SWITCH

Jules J. Bertrand, Watervliet, N. Y.

Application March 21, 1952, Serial No. 277,861

2 Claims. (Cl. 200—16)

This invention relates to electric signal systems, and more particularly to a signal light system adapted to be mounted on an automotive vehicle to indicate acceleration or deceleration of the vehicle.

It is among the objects of the invention to provide an improved signal system which can be conveniently mounted on an automotive vehicle and operated by vehicle control instrumentalities, such as the vehicle throttle and brake; which includes a compound signal lamp arranged to give a stop warning to a driver approaching from the rear of the vehicle carrying the lamp and to also indicate deceleration or acceleration of the associated vehicle; which gives a slow or caution warning to a following driver when the power of a leading vehicle is cut off, and a clear signal when the leading vehicle is operating under power; which can be installed on an existing automotive vehicle with no material modification of the vehicle construction; and which is simple and durable in construction, economical to manufacture and install, and positive and effective in operation.

Other objects and advantages will become apparent from a consideration of the following description and the appended claims in conjunction with the accompanying drawings, wherein:

Figure 1 is a side elevational view of a vehicle carburetor and throttle with a two-position switch constituting a part of a signal system according to the invention mounted on the carburetor and operated by the throttle;

Figure 2 is a side elevational view of a vehicle brake master cylinder and brake pedal and switches associated therewith in accordance with the invention for actuation by fluid pressure within the brake master cylinder;

Figure 3 is a perspective view of a compound signal lamp constituting a component of the system;

Figure 4 is a longitudinal cross-sectional view on an enlarged scale of the two-position switch illustrated in Figure 1;

Figure 5 is a transverse cross-sectional view on the line 5—5 of Figure 4;

Figure 6 is a cross-sectional view on an enlarged scale on the line 6—6 of Figure 2;

Figure 7 is a fragmentary cross-sectional view on the line 7—7 of Figure 6;

Figure 8 is a fragmentary cross-sectional view similar to Figure 7, but showing the parts in a different operative position from that shown in Figure 7;

Figure 9 is a perspective view of the rear or back side of the lamp illustrated in Figure 3; and Figure 10 is a wiring diagram for the signal system.

With continued reference to the drawings, the lamp, generally indicated at 10, is adapted to be mounted on a vehicle at the rear or back end of the vehicle and comprises a hollow casing 11 of elongated, rectangular shape, interiorly divided by partitions 12, 13 and 14 into four compartments, one of which extends longitudinally of the lamp housing adjacent the upper side of the lamp, and the other three of which are disposed in side-by-side relationship adjacent the lower side of the lamp. One side of the casing is closed by a back or bottom wall 15 in which lamp bulb sockets 16, 17, 18 and 19 are mounted, one socket extending through the back wall into each of the compartments provided by the partitions 12, 13 and 14, and the open side of the housing 11 is closed by a lens structure 20 which includes a stop signal portion 21 covering the compartment at the upper side of the lamp, caution signals 22 and 23 covering the end compartments at the lower side of the lamp, and a clear signal 24 covering the center compartment at the lower side of the lamp. Lamp bulbs, as indicated at 25, are mounted one in each of the lamp bulb sockets and disposed in the corresponding compartments of the signal lamp, and when energized illuminate the respective signals.

The lens 20 is secured on the lamp housing 11 by a suitable frame 26 having a marginal flange or bezel 27 which receives the lamp housing 11 at the open side of the latter and is detachably secured to the lamp housing.

A two-position switch, generally indicated at 30, is mounted on the engine carburetor 31 by an angle bracket 32 and includes a hollow housing or cylinder 33 of electrically insulative material, and a plunger 34 received in the bore of the cylinder 33 for sliding movement longitudinally of the cylinder. The housing and plunger have corresponding flat sides, as indicated at 28, to maintain the plunger against rotation in the housing.

The switch housing 33 is closed at one end by a fixed end wall 35 and a compression spring 36 is disposed between the end wall 35 and the adjacent end of the plunger 34 resiliently urging the plunger toward the other end of the housing. The other end of the housing is closed by a detachable end wall 37 which provides a stop for movements of the plunger by the spring 36.

The end wall 37 is provided with an aperture and a stud 38 extends through this aperture and is threaded at one end into the adjacent end of the plunger 34. An adjusting screw 39 is threaded into the other end of the stud and projects therefrom for engagement by the vehicle throttle lever 40. A lock nut 29 is threaded onto the screw 39 and bears against the adjacent end of the stud 38 to lock the screw in selected positions of adjustment relative to the stud, and a throttle rod 45 is connected to the throttle lever 40 and moved in a throttle closing direction by a spring 46 connected to the rod 45.

A contact plate 41 of electrically conductive material, shorter than the plunger 34, is mounted on the plunger, and a center contact 42 extends through the wall of the cylinder or switch housing 33 adjacent the mid-length location of the housing and engages the contact plate 41 adjacent the mid-length location of the latter.

Side contacts 43 and 44 extend through the wall of the switch housing 33 in position such that the three contacts are in alignment longitudinally of the housing, and these side contacts are so spaced from the center contact that when the plunger 34 is against the end wall 37, the side contact 34 is connected by the contact plate 41 to the center contact 42, the side contact 43 being then beyond the adjacent end of the contact plate and disconnected from the center contact, and when the plunger 34 is moved toward the end wall 35, the side contact 43 is connected by the contact plate 41 to the center contact 42, and the contact plate is moved away from the side contact 44, thereby disconnecting this side contact from the center contact.

A compound switch, generally indicated at 50, is mounted on the brake master cylinder 51, and includes a socket 52 having at one end a screw-threaded extension 53 of reduced diameter screw-threaded into the outer end of a bore 54 which extends through the wall of the master cylinder 51 to the interior of the latter. A bore 55 extends through the extension 53 of the socket 52 and leads at its inner end into a chamber 56 provided in the socket.

A plug 57 of electrically insulative material is mounted in the chamber 56 of the socket 52 and extends outwardly of the end of the socket remote from the extension 53, and a flexible diaphragm 58 of electrically conductive material underlies the inner end of the plug 57 and is marginally secured between this plug and an annular shoulder provided in the socket. A sealing diaphragm 47 of rubber or similar material is disposed at the side of the diaphragm 58 remote from plug 57 and marginally secured between the socket and the plug to provide a safety seal for the brake master cylinder.

Contact posts 59 and 60 extend through the insulative plug 57 at spaced apart locations, and the contact post 59 is connected to one side of the battery 62 by a conductor 61, the other side of the battery being grounded, as indicated at 63. A car ignition switch 64 is connected into the conductor 61 to control the operation of the lamp. The contact post 60 is connected by a conductor 65 to the socket 16 carrying the lamp bulb which illuminates the stop signal 21, one side of this socket being grounded, as indicated at 66.

With this arrangement, when the brake pedal 67 is operated to compress brake fluid in the cylinder 51, the pressure of the fluid acting against the diaphragm 58 moves this diaphragm into electrically conductive engagement with the adjacent ends of the contact posts 59 and 60 and establishes a circuit from the battery 62 to the lamp bulb socket 16, which is disposed in the "stop" light compartment covered by the lens 21 of the lamp.

A pin 68 of electrically insulative material extends through a centrally disposed bore in the plug 57 and has one end in engagement with the diaphragm 58. A binding post 70 is mounted in the plug 57 at a location angularly spaced from the contact posts 59 and 60 and projects above the top of the plug. A flat spring contact element 71 is mounted at one end on the contact post 59 at the end of the latter remote from the diaphragm 58, and has at its other end an aperture through which the adjacent end of the pin 68 extends, and a complementary contact spring 72 is mounted at one end on the binding post 70 and has its other end overlying the apertured end of the spring element 71. The spring elements 71 and 72 are normally in contact with each other to provide a normally closed switch and a conductor 73 connects the switch contact 72 to the center contact 42 of the two-position switch 30. When the diaphragm 58 is moved by pressure of the brake fluid in cylinder 51 to inter-connect the contact posts 59 and 60 and illuminate the stop light 21, the pin 68 passing through the switch element 71 moves the switch element 72 away from the switch element 71, thereby opening the normally closed switch provided by these switch elements, and disconnecting the center terminal of the switch 30 from the battery, so that the signal lights 22—23 and 24 cannot be illuminated while the stop light is illuminated.

A conductor 75 connects the side terminal 43 of the two-position switch 30 to the sockets 17 and 19, holding the bulbs which illuminate the warning signals 22—23. As these bulbs are illuminated simultaneously, they are treated as a single bulb and the corresponding sockets 17—19 are shown as a single socket.

A conductor 76 connects the side terminal 44 of the two-position switch 30 to the socket 18 which carries the lamp bulb illuminating the clear signal light or lamp 24.

With the above-described arrangement, and with the brake off so that the switch including the spring contact elements 71 and 72 is closed, if no pressure is being exerted on the throttle rod 45 and the retracting spring 46 has consequently moved the throttle to closed condition, throttle lever 40 will have moved stud 38 inwardly of switch housing 33 and will have moved plunger 34 toward the end wall 35 of the switch housing against the force of spring 36. The contact plate 41 will now be moved to connect the side contact 43 with and disconnect the side contact 44 from the center contact 42 of the swich 30.

Current will now flow from the battery through the conductor 61 to the switch element 71, from the switch element 71 to the switch element 72 and from 72 through the conductor 73 to the center contact 42 of the switch 30. From the center contact 42 the current flows through the contact plate 41 to the side contact 43 and from the side contact 43 through the conductor 75 to the sockets 17—19 of the warning lights 22—23. From the sockets 17—19 the circuit is completed to the battery through the ground connection 63.

If the throttle rod is now subjected to throttle opening pressure overcoming the force of retracting spring 46, throttle lever 40 will be moved away from screw 39 and spring 36 will move plunger 34 into engagement with end wall 37, thereby moving contact plate 41 to disconnect side contact 43 from and connect side contact 44 with the center contact 42 of the two-position switch 30. After the plunger 34 has moved into engagement with the end wall 37 of the switch housing, the throttle and its associated parts may continue to move in a throttle opening direcion.

With the side contact 44 connected to the center contact 42 of the switch 30 and the center contact connected to the battery in the manner described above, current will now flow from the center contact through the contact plate 41 to the side contact 44 and from this side contact through the conductor 76 to the socket 18 of the clear signal lamp 24.

Under these conditions the lamp 10 will indicate caution or clear as the engine throttle is closed or open with the brake off and will give only its stop signal when the brake is applied.

A hollow cap 80 of elastic material, such as rubber, is mounted on the end of the plug 57 remote from the diaphragm 58 and covers the exposed end of the contact post and the spring contact elements, the conductors 61, 65 and 73 extending through a beaded grommet 81 provided at the end of the cap 80 remote from the plug 57.

It is to be understood that the two-position switch 30 may be provided in various forms and may be of rectangular cross-sectional shape, if desired, as well as the circular cross-sectional shape illustrated in the accompanying drawings.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with an automotive vehicle having a carburetor having a throttle lever, a two-position switch comprising a tubular housing having a side wall, a closed end wall and another end wall, a middle contact traversing said side wall at a point intermediate and spaced from said end walls, said middle contact projecting into the interior of said housing, a second contact traversing said side wall and projecting into the interior of said housing at a point between and spaced from said middle contact and said closed end wall, a third contact traversing said side wall and projecting into the interior of said housing at a point between and spaced from said middle contact and said other end wall, said contacts being insulated from each other, a plunger slidably fitting in said housing and shorter than said housing, said plunger being of insulated material and said contacts being substantially in alignment with each other lengthwise of the plunger, a contactor plate on said plunger, said contactor plate extending lengthwise of the plunger and terminating at its ends in spaced relation to the ends of the plunger, said contactor plate being of a length to bridge said middle contact and only one of said side contacts at a time, said contactor plate having a depression spaced from its opposite ends in which said middle contact is constantly engaged, said depression having ends serving as limit stops engageable by said middle contact in extreme positions of said plunger in which said contact plate is engaged with only one of said side contacts, spring means acting between said closed end wall of the housing and said plunger and urging said plunger toward said other end wall of the housing, and an extension on an end of said plunger traversing said other end wall and operatively engaged with said throttle lever.

2. In combination with an automotive vehicle having a carburetor having a throttle lever, a two-position switch comprising a tubular housing having a side wall, closed end wall and another end wall, a middle contact traversing said side wall at a point intermediate and spaced from said end walls, said middle contact projecting into the interior of said housing, a second contact traversing said side wall and projecting into the interior of said housing at a point between and spaced from said middle contact and said closed end wall, a third contact traversing said side wall and projecting into the interior of said housing at a point between and spaced from said middle contact and said other end wall, said contacts being insulated from each other, a plunger slidably fitting in said housing and shorter than said housing, said plunger being of insulated material and said contacts being substantially in alignment with each other lengthwise of the plunger, a contactor plate on said plunger, said contactor plate extending lengthwise of the plunger and terminating at its ends in spaced relation to the ends of the plunger, said contactor plate being of a length to bridge said middle contact and only one of said side contacts at a time, said contactor plate having a depression spaced from its opposite ends in which said middle contact is constantly engaged, said depression having ends serving as limit stops engageable by said middle contact in extreme positions of said plunger in which said contact plate is engaged with only one of said side contacts, spring means acting between said closed end wall of the housing and said plunger and urging said plunger toward said other end wall of the housing, and an extension on an end of said plunger traversing said other end wall and operatively engaged with said throttle lever, said contacts having terminals comprising spring pressed balls yieldably engaging the plunger and said contactor plate, said plunger being provided with ball recesses between the ends of said contactor plate and the ends of the plunger for securing the balls of the side contactor while the middle contact is in engagement with an end of said depression in extreme positions of the plunger.

References Cited in the file of this patent

UNITED STATES PATENTS

| | | |
|---|---|---|
| 1,473,212 | Davis | Nov. 6, 1923 |
| 1,878,090 | Alcoriza | Sept. 20, 1932 |
| 2,096,069 | Seiden | Oct. 19, 1937 |
| 2,128,769 | Finnell | Aug. 30, 1938 |
| 2,250,133 | Pearce et al. | July 22, 1941 |
| 2,260,680 | Nelsen | Oct. 28, 1941 |
| 2,520,681 | Hanson, Jr. | Aug. 29, 1950 |
| 2,564,957 | Cermak | Aug. 21, 1951 |